US007111610B2

(12) United States Patent
Nidigattu

(10) Patent No.: US 7,111,610 B2
(45) Date of Patent: Sep. 26, 2006

(54) ELECTRONIC THROTTLE BODY CONTROL SYSTEM AND METHOD

(75) Inventor: Uma Poleswara Rao Nidigattu, Newport News, VA (US)

(73) Assignee: Siemens VDO Automotive Corporation, Auburn Hills ( * ) Notice: Subject to any disclaimer, the term of this patent is extended or adjusted under 35 U.S.C. 154(b) by 0 days.

(21) Appl. No.: 11/002,023

(22) Filed: Dec. 2, 2004

(65) Prior Publication Data

US 2005/0120999 A1 Jun. 9, 2005

Related U.S. Application Data

(60) Provisional application No. 60/526,554, filed on Dec. 3, 2003, provisional application No. 60/526,577, filed on Dec. 3, 2003, provisional application No. 60/526,578, filed on Dec. 3, 2003.

(51) Int. Cl.
*F02D 41/22* (2006.01)
*G01M 15/00* (2006.01)

(52) U.S. Cl. ...................... 123/399; 123/396; 73/118.2

(58) Field of Classification Search ................ 123/361, 123/396–399; 73/118.1, 118.2; 701/110, 701/114–115

See application file for complete search history.

(56) References Cited

U.S. PATENT DOCUMENTS 5,078,110 A * 1/1992 Rodefeld .................... 123/399
6,167,866 B1 * 1/2001 Jakisch et al. .............. 123/396
6,345,604 B1 * 2/2002 Ahrns et al. ................ 123/398
6,431,144 B1 * 8/2002 Daly .......................... 123/399
6,539,918 B1 * 4/2003 Pursifull ..................... 123/399
6,543,415 B1 * 4/2003 Pursifull et al. ............ 123/396
6,588,260 B1 * 7/2003 Pursifull .................... 73/118.1
6,701,891 B1 * 3/2004 Niki et al. .................. 123/396
6,711,492 B1 * 3/2004 Pursifull et al. ............ 701/114
2005/0051134 A1 * 3/2005 Valascho et al. ............ 123/399
2005/0155574 A1 * 7/2005 Hedrick et al. ............. 123/399

FOREIGN PATENT DOCUMENTS

JP 2002-161758 * 6/2002

* cited by examiner

*Primary Examiner*—Hai Huynh

(57) ABSTRACT

An electronic throttle body control system (100) and method provides accurate control over a throttle plate (102) position via various functions. An ice breaking function detects whether there is ice blocking the path of the throttle plate (102) and vibrates the throttle plate (102) to break and remove the ice. A mechanical stop confirmation function that confirms a mechanical stop position each time the vehicle is turned on to ensure that adaptation values for the throttle plate (102) are calculated accurately. A miswiring detection function detects miswirings by detecting whether the actual movement of the throttle plate (102) is in a direction opposite to the setpoint target direction.

11 Claims, 4 Drawing Sheets

ELECTRONIC THROTTLE BODY CONTROL SYSTEM AND METHOD

REFERENCE TO RELATED APPLICATIONS

The present invention claims the benefit of U.S. Provisional Patent Ser. Nos. 60/526,554, filed Dec. 3, 2003; 60/526,577, filed Dec. 3, 2003; and 60/526,578, filed Dec. 3, 2003.

TECHNICAL FIELD

The present invention relates to electronic throttle body control, and more particularly to a system and method of controlling an electronic throttle body control plate.

BACKGROUND OF THE INVENTION

An electronic throttle body throttle plate in a vehicle controls the air-fuel ratio within a combustion chamber of an internal combustion engine. Proper positioning of the throttle plate is critical for efficient engine operation. The throttle plate itself can move between a lower mechanical stop (LMS) position, in which the throttle plate is at an angular position of zero degrees (i.e., a completely closed throttle position) to a maximum travel position (i.e., a wide open throttle position). The amount of air entering the combustion chamber depends on the angular position of the control plate, and the proper throttle plate position for a given air-fuel ratio is dictated by a position of an acceleration pedal in the vehicle, which controls how much air and fuel enter the combustion chamber.

There are various conditions where the plate will not reach a desired position. For example, during low temperature conditions, it is possible for ice to form on the throttle plate or on a body in which the throttle plate operates. This ice formation will block movement of the throttle plate to its desired position.

Varying temperature conditions, friction, and/or changing battery voltages may also cause a calculated lower mechanical stop (LMS) position value (e.g., the position at which the position of the throttle plate is at, for example, zero degrees and where the throttle is completely closed) to change. Because mass air flow in the throttle body is calculated based on the LMS value, any inaccuracies in determining the LMS value will create inaccuracies in calculating mass air flow. However, currently known systems without EEPROMs cannot store the LMS values of previous driving cycles and instead recalculate the adaptation values each time the vehicle is turned on. Although the system does attempt to move the throttle plate to the LMS position before calculating the adaptation values, friction in the throttle body, fluctuating battery voltages, and other factors may cause the throttle plate position to be different than the actual LMS position. Moreover, the LMS position itself may change due to these conditions or as the system ages. This causes the adaptation values to be calculated incorrectly and cause inefficiencies in engine operation.

Moreover, the angular position of the throttle plate may be incorrect due to miswirings in the electronic throttle body control that may occur during vehicle assembly or component replacement. Miswirings may cause the throttle plate to move in a direction opposite to the desired direction. If the throttle plate is allowed to continue moving in an undesired direction, the resulting improper air-fuel ratio may cause adverse effects in the engine and potentially damaging vehicle operation.

There is a desire for an electronic throttle body control that ensures proper throttle plate positioning even under adverse or changing environmental conditions. There is also a desire for an electronic throttle body control that can adapt to any variations in the LMS value to ensure accurate throttle plate position.

SUMMARY OF THE INVENTION

The present invention is directed to an electronic throttle body control system and method to provide accurate control over a throttle plate position. The system includes an ice breaking function that detects whether there is ice blocking the path of the throttle plate and operates the throttle plate to break and remove the ice.

The system also includes a function that confirms a mechanical stop position, such as a lower mechanical stop position, each time the vehicle is turned on to ensure that adaptation values for the throttle plate are calculated accurately. The throttle plate is moved first via closed loop control and then open loop control toward the mechanical stop and then held at the mechanical stop for a selected period of time to confirm the throttle plate position.

The system further includes a miswiring detection function that detects miswirings by comparing the actual direction in which the throttle plate is moving with a requested setpoint. If the system detects that the throttle plate is moving away from the setpoint (i.e., in a direction opposite to the desired direction) for a predetermined time period, the system indicates the existence of a miswired connection in the system.

By incorporating one or more functions that monitor and control the operation of the throttle plate more closely when the vehicle is initially turned on, the invention ensures that the throttle plate position will provide the correct desired air-fuel ratio in the engine, thereby improving engine efficiency.

DETAILED DESCRIPTION OF THE PREFERRED EMBODIMENT

Figure 1:
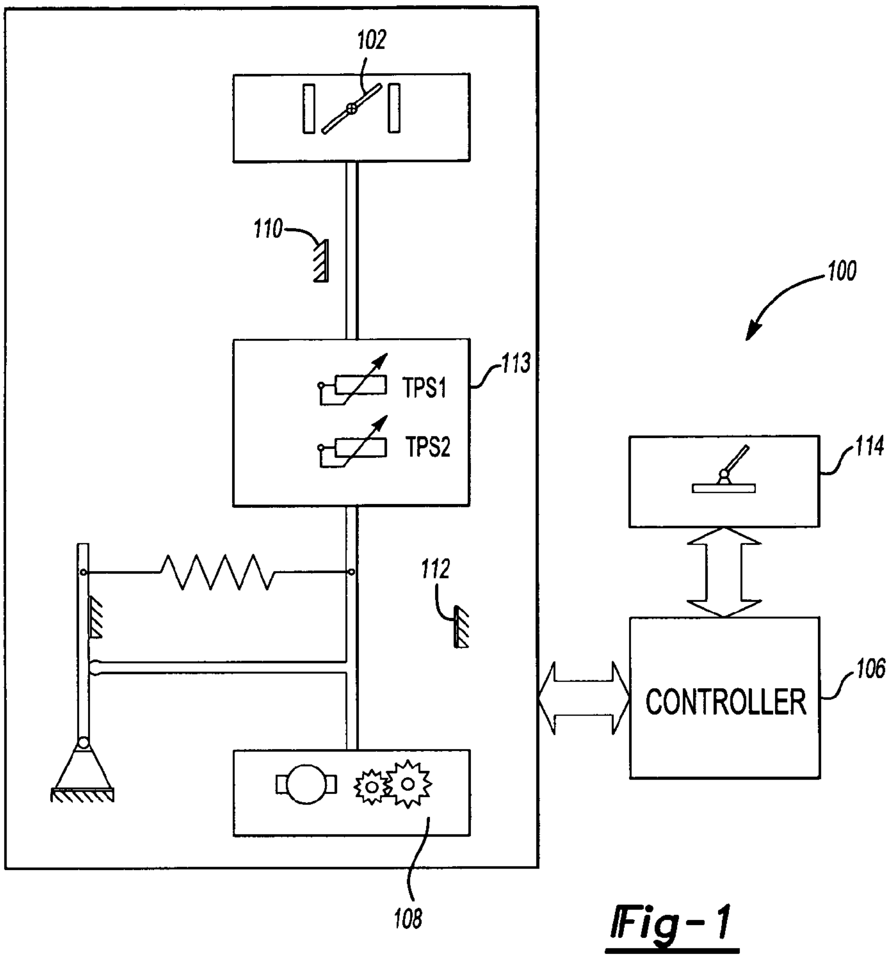
FIG. 1 is a representative diagram of an electronic throttle body control system according to one embodiment of the invention.

FIG. 1 is a representative diagram of an electronic throttle body control system 100 according to one embodiment of the invention. The system 100 includes a throttle plate 102 that is rotatable within a throttle bore 104. The movement of the throttle plate 102 is controlled by an electronic controller 106 that operates a drive unit 108. A lower mechanical stop (LMS) 110 and an upper mechanical stop (UMS) 112 define the extreme positions of the throttle plate 102. In one example, the LMS 110 corresponds to a fully closed throttle at which the angular position of the throttle plate 102 is, for example, zero degrees. The UMS 112 corresponds to a fully open throttle at which the angular position of the throttle plate 102 is at its maximum. The mass air flow through the throttle bore 104 is based on adaptation values of the LMS 110 position, and the throttle plate 102 can move in both positive and negative angular directions relative to the LMS 110 position.

As is known in the art, the throttle plate 102 is at a default or limp home position if there is no power being supplied to the throttle (e.g., when the vehicle key is switched off) and has a minimum position at the LMS 110 when the vehicle key is switched on. Note that the actual LMS 110 position can vary each time the vehicle is turned on, within mechanical and electrical tolerances. At least one potentiometer sensor 113 is arranged in the system 100 to detect the position of the throttle plate 102. In the illustrated example, the throttle plate 102 has a positive potentiometer sensor and a negative potentiometer sensor, each corresponding to different ranges of the throttle plate 102 (e.g., a positive sensor TPS1 has a voltage range of 0.25V to 4.75V corresponding to 0 degrees to 82.5 degrees, and a negative sensor TPS2 has a voltage range of 4.75V to 0.25V corresponding to 82.5 degrees to 0 degrees). A set point sender 114 is simply an acceleration pedal whose position is used by the controller 106 to determine the proper throttle plate 102 position corresponding to the driver demand indicated by the set point sender 114.

Figure 2:
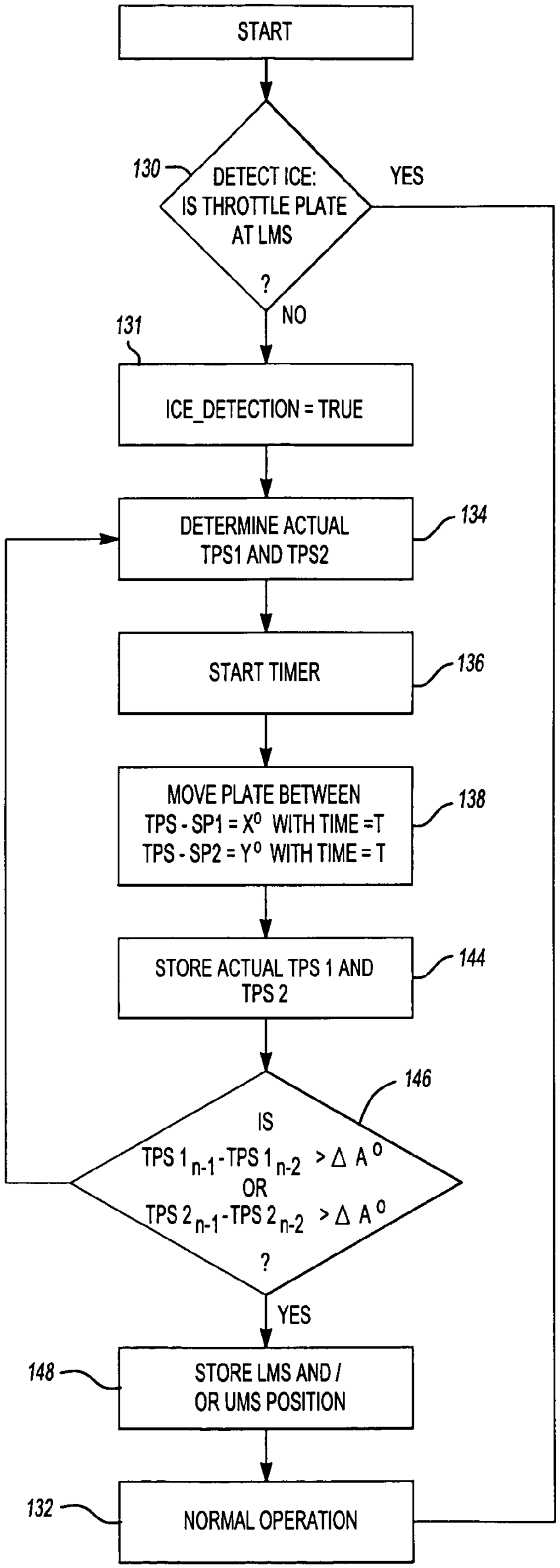
FIG. 2 is a flow diagram of an ice breaking method according to one embodiment of the invention.

FIG. 2 is a flow diagram illustrating a method of ensuring accurate throttle plate positioning by detecting the presence of any ice blocking the path of the throttle plate 102 and The method can be carried out as an algorithm in any known manner. Generally, the method breaks and removes any ice that prevents the throttle plate 102 from reaching a fully closed position by executing an icebreaker throttle control process if ice is detected, determining when the throttle plate 102 is free of ice, and then recalibrating the closed position of the throttle plate 102. In one example, this ice breaking method is enabled each time the vehicle is turned on and if there are no other detected faults in the system 100.

More particularly, the method first includes an ice detection step (block 130). In one embodiment, the ice detection step 130 determines whether ice is blocking the path of the throttle plate 102 by checking whether the throttle plate 102 is movable to the LMS 110 position. If ice is in the path of the throttle plate 102, it will block the throttle plate 102 from reaching the LMS 110 position. Thus, no contact will be detected between the LMS 110 and the throttle plate 102. At this point, the electronic controller 106 sets an ice detection flag to be true, indicating that there is ice in the throttle bore 104 (block 131). The electronic controller 106 may also incorporate a delay (e.g., 200 ms) after detecting that the throttle plate 102 does not reach the LMS 110 before initiating an ice breaking process to make sure that the throttle plate 102 is truly blocked from movement.

If there is no ice preventing the throttle plate 102 from reaching the LMS 110, the throttle plate 102 will contact the LMS 110. In this case, no ice breaking is needed, and the electronic controller 106 will therefore allow the throttle plate to operate normally (block 132).

If ice breaking is needed, however, the electronic controller 106 first rotates the throttle plate 102 to the most extreme positions TPS1 and TPS2 that the throttle plate 102 can reach (block 134). Because of the ice blockage, the first and second actual positions TPS1 and TPS2 will fall short of the desired positions (e.g., LMS 110 and UMS 112). To remove the ice, the electronic controller 106 instructs the throttle plate 102 to move toward a first set point position and then toward a second set point position, thereby vibrating the throttle plate 102.

More particularly, the electronic controller 106 first determines the first and second actual positions TPS1 and TPS2 of the throttle plate (block 134) and then starts a timer (block 136). The throttle plate 102 positions, which correspond to the positions of the drive unit 108, may be detected by monitoring position signals produced by, for example, a double-output potentiometer using closed-loop setpoints. The electronic controller 106 then moves the throttle plate 102 toward the first set point position, which is set to x degrees (e.g., 20 degrees) and held in place for a selected time delay $T_n$ (block 138). Even though the throttle plate 102 may not be able to reach the first set point position at this stage due to the ice blockage, it will still apply force on the ice, causing the ice to loosen and/or fracture.

The throttle plate 102 is then moved toward the second set point position, which is set to y degrees (e.g., 2 degrees) and held in place for the selected time delay $T_n$ (block 138). During each throttle plate 102 movement, the first and second actual positions of the throttle plate 102 are stored (block 144). Because the throttle plate 102 vibrates between the first and second set point positions, the first and second actual positions of the throttle plate 102 during consecutive time periods will change as the ice shifts and starts to fracture. This shift in position will tend to be small until the throttle plate 102 breaks free from the ice, at which the change in the actual position between two consecutive time periods will be significantly larger because the throttle plate 102 can move freely.

To detect the ice breakage, the method compares the first actual position of the throttle plate 102 between two time periods, such as TPS$\mathbf{1}_n$ and TPS$\mathbf{1}_{n-1}$, and the second actual position of the throttle plate between two time periods TPS$\mathbf{2}_n$ and TPS$\mathbf{2}_{n-1}$ (block 146). The time periods do not need to be consecutive; the two actual positions may be measured after the throttle plate 102 has vibrated toward the two set point positions several times. The time delay itself can be any desired time, such as 50 ms. If a difference between two first actual positions or two second actual positions is less than a selected threshold of ΔA degrees, it indicates that ice is still blocking the throttle plate 102 and that the throttle plate 102 has not applied enough force to break the ice. The threshold ΔA itself reflects the throttle plate movement range during normal operation. The ice breaking process then repeats, again monitoring the actual throttle plate positions (block 134).

If the difference is greater than the selected threshold ΔA degrees, it indicates that the ice has either shifted a large amount or has broken free to allow the throttle plate to move normally. In this case, the method then holds the throttle plate 102 in at least one actual position TPS1 and TPS2 and stores the actual position as the LMS 110 position and/or the UMS 112 position (block 148) and then proceeds to normal throttle system 100 operation (block 132). In one embodiment, the throttle plate 102 is driven to its lowest possible position TPS1 and held until the electronic controller 106 no longer requests the ice breaker operation. At this point, the held position is considered the LMS 110 position. In essence, the method selects a point at which the throttle plate 102 is considered free enough for proper operation when it is within a proper range where the throttle plate 102 can be considered closed, even if does not actually contact the LMS 110. This places a practical time limit on the ice breaking method (e.g., 7 seconds)

Thus, by providing closed-loop positive and negative throttle position set points and moving the throttle plate between the set points, the invention can break up ice forming in the system 100. Note that the actual amount of time needed to break the ice may depend on, for example, the ice thickness and the battery voltage.

Figure 3:
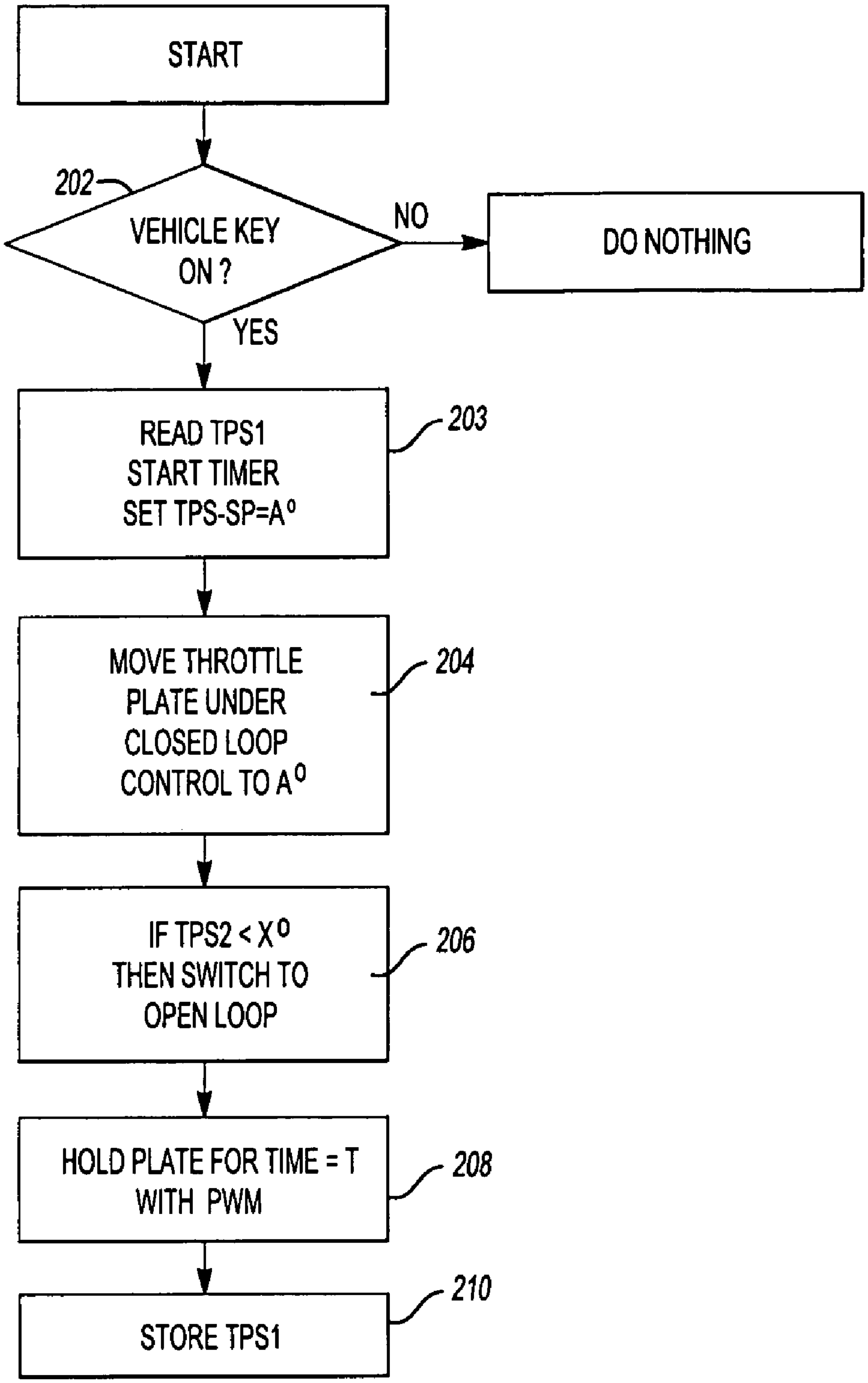
FIG. 3 is a flow diagram of a throttle body position adaptation method according to one embodiment of the invention.

Referring to FIG. 3, the invention also improves operation of the system 100 by ensuring that the LMS 110 position is correct before calculating the adaptation values from the LMS 110. For simplicity, the method will be described with respect to only the LMS value, but it is to be understood that the UMS value, or both the LMS and the UMS values, may be adjusted using the inventive method. As noted above, currently known systems have no mechanism for checking whether the throttle plate 102 is actually at the LMS 110 before calculating the LMS adaptation values. The system 100 must also relearn and recalculate the LMS 110 value each time the vehicle is turned on because the LMS value from the previous vehicle operation is not stored in the system 100. As a result, it is possible for the adaptation values to be calculated based on an erroneous LMS value if the throttle plate 102 is not actually at the LMS 110 when the adaptation values are calculated.

To avoid this problem, one embodiment of the invention incorporates an adaptation routine 200 that is conducted each time the vehicle is turned on to ensure that the LMS 110 value is correct each time the vehicle is operated. As shown in FIG. 3, the method generally positions the throttle plate 102 at zero degrees (i.e., the LMS 110) within a specific time period after the vehicle is turned on. In one embodiment, the LMS 110 position should achieved within 50 ms of the vehicle being turned on so that the engine will start a reasonable time after the key is turned to the "on" position.

In one embodiment, the controller 106 first checks to see whether the vehicle key has turned the ignition on (block 202). If not, the controller 106 does nothing further (block 204). However, if the vehicle is turned on, the controller 106 first checks the actual position of throttle plate 102, starts a timer, and sets a setpoint value TPS_SP of A degrees, which corresponds to the throttle plate position at the LMS 110 (block 203), starts driving the throttle plate 102 under closed loop control to the LMS 110 from the default position (i.e., the position of the throttle plate 102 when no power or spring force is being applied to the throttle plate 102) toward the LMS 110 position. The controller 106 continues to drive the throttle plate 102 under closed loop control until the position of the throttle plate TPS1 reaches a setpoint position of A degrees (block 204). In other words, the throttle plate 102 is driven under closed loop control toward the setpoint position. In one embodiment, the feedback of the throttle plate position to the controller 106 is achieved in a manner similar to DC motor drive position detection by, for example, a double-output potentiometer.

Once the throttle plate 102 reaches the setpoint position of A degrees, the controller 106 switches to open loop control with negative pulse width modulation (block 206) and continues to drive the throttle plate 102 to confirm that the throttle plate 102 has reached the LMS 110. Note that combining both closed loop control and open loop control ensures that the throttle plate 102 reaches the LMS 110 without being damaged due to the throttle plate 102 overshooting the LMS 110 position and hitting a bore or other portions of the system, which may occur if only open loop control were used.

Once the throttle plate 102 has reached the LMS 110, the throttle plate 102 is held in the LMS 110 position by continuing to apply open loop control with negative pulse width modulation for a selected time period controlled by the timer (block 208). This holding step confirms that the throttle plate 102 is indeed at the LMS 110 and is in a steady state position. In one embodiment, the duty cycle of the pulse width modulated signal at this stage is different than the duty cycle used to drive the throttle plate 102. Once the LMS 110 is confirmed, the position of the throttle plate 102 at the LMS 110 is stored and is ready to use for computing adaptation values (block 210).

Another way to improve electronic throttle body control is to incorporate a miswiring detecting mechanism. As noted above, incorrect wiring in the system 100 can lead to adverse effects by moving the throttle plate 102 to an incorrect position, resulting in an incorrect air-fuel ratio in the engine. More particularly, miswirings may cause the throttle plate to move in a direction opposite to the desired direction. The miswirings themselves may occur during new installation of the system 100 or when system parts are serviced or replaced.

Figure 4:
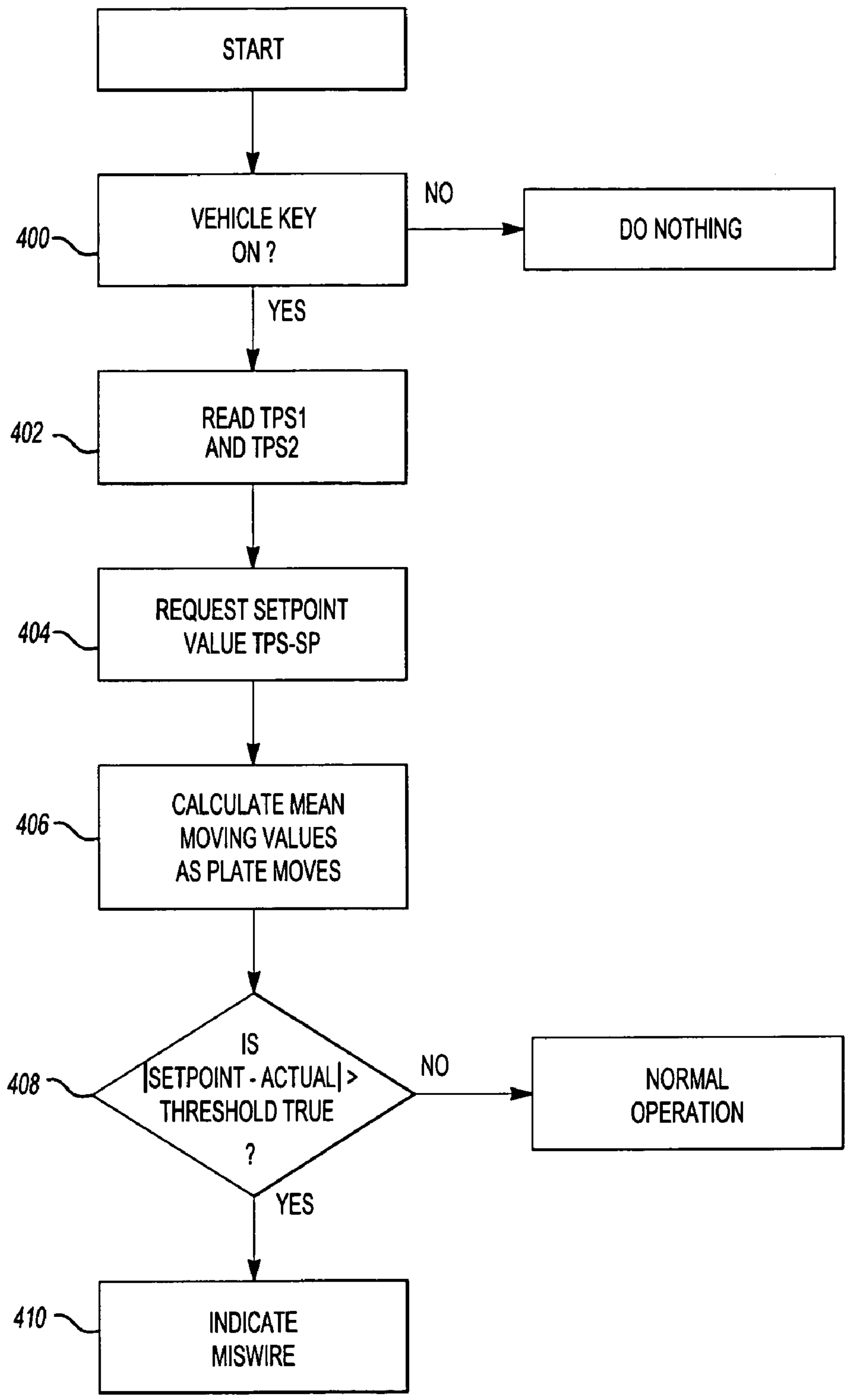
FIG. 4 is a flow diagram of a throttle body control miswiring detection method according to one embodiment of the invention.

FIG. 4 is a flow diagram illustrating a miswiring detection process according to one embodiment of the invention. When the vehicle is initially turned on (block 400), the controller 106 requests the throttle plate 102 to move toward the LMS 110 as explained above so that the controller 106 can determine at which point the throttle plate 102 is at the LMS 110 position and calculate proper adaptation values (block 402).

To do this, the controller 106 requests a throttle plate setpoint value, which is the target position of the throttle plate 102 (block 404). As the throttle plate 102 moves in response to the controller 106 request, the controller also calculates mean moving values of the throttle plate 102 position (block 406). The mean moving values are simply the sum of the angular positions of the throttle plate 102 at selected time intervals (e.g., every 2 milliseconds) between the time the vehicle is turned on and the time the throttle plate 102 is calibrated. This mean moving value reflects the direction that the throttle plate 102 is actually moving by summing and averaging the actual positions of the throttle plate 102 over time.

Figure 5:
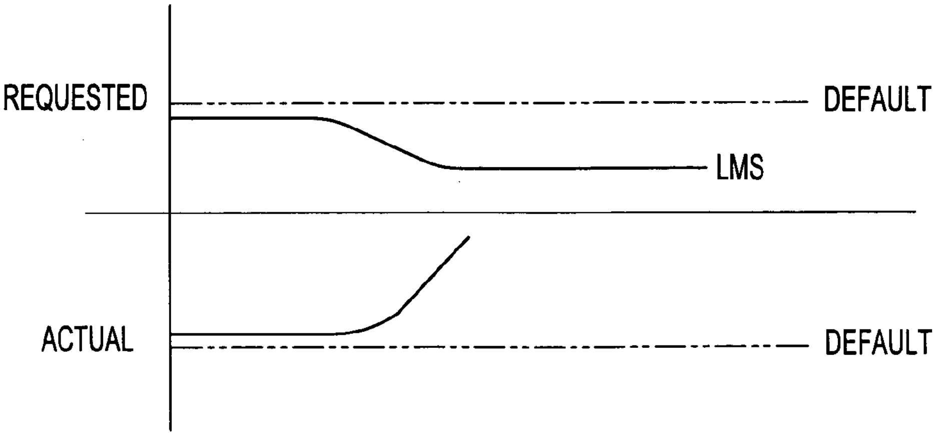
FIG. 5 is a representative diagram illustrating how miswiring is detected.

As shown in FIG. 5, miswiring in the system 100 will cause the throttle plate 102 to move in a direction opposite the requested direction. After a selected time period (e.g., 50 milliseconds), the controller calculates the difference between the throttle plate setpoint value and the actual throttle plate position (block 408). If the difference between the setpoint position and the actual position is greater than a selected threshold and if the calculated mean moving value indicates that the actual throttle plate position is moving away from the setpoint, the controller 106 will indicate that a miswiring exists (block 410). Note that an actual moving path curve in FIG. 5 formed by the actual throttle plate 102 position may be interpolated by the controller 106 and compared with a look-up table that contains values defining a predefined interpolation curve to compare the actual moving path and the setpoint moving path.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An electronic throttle plate control system for a vehicle, comprising:

a movable throttle plate;

a drive unit that drives the throttle plate; and a controller that controls the drive unit and monitors the throttle plate position, wherein the controller checks whether the throttle plate is rotatable to a selected position when the vehicle is initially turned on and vibrates the throttle plate responsive to the throttle plate not being rotatable to the selected position.

2. The system of claim 1, wherein the selected position is a mechanical stop from which at least one adaptation value is calculated.

3. The system of claim 2, wherein the controller drives the drive unit to vibrate the throttle plate between a first setpoint and a second setpoint if the throttle plate is not rotatable to the mechanical stop.

4. The system as recited in claim 3, wherein the first set point and the second set point are disposed past an actual movement of the throttle plate such that the vibration of the throttle plate impacts any blockage preventing movement of the throttle plate to the selected position.

5. The system of claim 2, wherein the controller drives the drive unit toward the mechanical stop via closed loop control and open loop control and then holds the drive unit at the mechanical stop via open loop control.

6. The system of claim 2, wherein the controller indicates a miswiring in the system if the throttle plate is moving away from the selected position.

7. A method of controlling a throttle plate in a vehicle, comprising:

detecting an initial throttle plate position;

moving the throttle plate in response to a request toward a setpoint;

monitoring the direction of movement of the throttle plate with respect to the setpoint; and indicating a miswiring if the throttle plate moves away from the setpoint.

8. The method of claim 7, wherein the monitoring step comprises:

calculating a mean moving value by summing a plurality of positions of the throttle plate;

comparing the mean moving value with the setpoint.

9. The method of claim 7, wherein the monitoring step comprises:

generating an actual moving path curve corresponding to the movement of the throttle plate; and comparing the actual moving path curve with a predefined interpolation curve corresponding to a setpoint moving path.

10. The method of claim 7, further comprising calculating a difference between the setpoint and an actual throttle plate position, wherein the indicating step is conducted when the difference exceeds a predetermined threshold.

11. The method as recited in claim 7, wherein the step of indicating a miswiring further includes indicating a miswiring responsive to the throttle plate moving in a direction opposite to a desired actuation direction.

* * * * *